United States Patent [19]

Ochsner

[11] 4,271,921
[45] Jun. 9, 1981

[54] ADJUSTABLE MOUNT FOR A TRACTOR CAB

[75] Inventor: Jon K. Ochsner, Cedar Falls, Iowa

[73] Assignee: Deere & Company, Moline, Ill.

[21] Appl. No.: 62,590

[22] Filed: Jul. 31, 1979

[51] Int. Cl.³ .............................................. B62D 23/00
[52] U.S. Cl. ................................ 180/89.12; 248/575; 296/35.1
[58] Field of Search ........................... 180/89.1, 89.12; 296/35.1; 248/566, 575, 577

[56] References Cited

U.S. PATENT DOCUMENTS

| | | | |
|---|---|---|---|
| 3,781,058 | 12/1973 | Ziolko | 180/89.1 |
| 3,797,604 | 3/1974 | Davis | 180/89.1 |

FOREIGN PATENT DOCUMENTS 253250 6/1926 United Kingdom ..................... 296/35.1

Primary Examiner—Randolph A. Reese
Assistant Examiner—John A. Carroll

[57] ABSTRACT

An adjustable resilient mount for use with a cab secured to a tractor by vibration isolating mounts. The mount is adjustable to selectively increase or decrease the spring rate of the vibration isolating mounts and change the resonant frequency of the cab on its mounts. The device is particularly useful for tuning out annoying low frequency cab vibrations induced by tire lugs contacting the ground.

18 Claims, 2 Drawing Figures

ADJUSTABLE MOUNT FOR A TRACTOR CAB

BACKGROUND OF THE INVENTION

The present invention relates generally to a tractor cab which is vibration isolated from the tractor chassis and more specifically to an adjustable mount system for eliminating low frequency vibrations introduced into the cab by tire lugs.

Tractor cabs have been provided on modern farm tractors to reduce noise, vibration and objectionable atmospheric conditions. Use of resilient mount assemblies is common to isolate the cab and controls from vibrations in the tractor chassis. Such mount assemblies are described, for example, in U.S. Reissue Pat. No. Re. 29,123 which shows use of forward and rearward pairs of resilient mount assemblies connecting the cab and control console to the chassis. A vibration problem often still exists in cabs with this and similar type mountings when utilized with tractors having lugged tires. As the tires rotate, forces resulting from the tire lugs contacting the ground are transmitted to the tractor chassis and ultimately to the cab through the resilient mounts. Although the mounts usually reduce the forces transmitted to the cab, at certain low frequencies corresponding to the natural frequencies of the cab, which depend upon the spring rate of the mount system and the mass of the cab, the entire cab vibrates. At certain ground speeds extremely annoying vibrations can occur. Often the annoying vibrations are present at a commonly used field-working speed. Such vibrations are very noticeable and objectionable to the operator who can see relative motion at low frequencies between the cab and other parts of the tractor. In addition, as cabs and isolation systems become more advanced and other noises and vibrations are reduced, the farmer increasingly notices the vibration caused by the tire lugs.

Heretofore, mount systems have provided no simple or effective means of eliminating the annoying vibration in the cab caused by the tire lugs. Attempts to decrease the vibration at resonance using different resilient material in the mounts or by adding shims between the chassis and the cab have generally decreased isolation effectiveness at higher frequencies. As a result, the higher frequency chassis vibratory modes and chassis noise were more readily sensed by the operator. Utilizing increased mount damping decreases the motion of the cab at the resonant frequency but also increases the noise level at frequencies above resonance.

SUMMARY OF THE INVENTION

It is therefore an object of the present invention to provide a mount system for a tractor cab which eliminates the above-mentioned problems.

It is yet another object of the present invention to provide an adjustable mount system for a tractor cab which reduces or eliminates cab resonances at the operating speed without noticeable reduction in noise and vibration isolation effectiveness at higher frequencies.

It is still another object of the invention to provide a mount system for a tractor cab which can be tuned to match the working conditions and operator's personal preferences.

It is a further object of the invention to provide an adjustable mount system for a tractor cab which permits the resonant frequency of the cab on its mounts to be changed quickly and easily to eliminate annoying vibrations in the cab induced by the tire lugs as the tractor is operating at the field-working speed.

An adjustable mount system includes an additional mount having an adjustable capscrew which is accessible to the operator. Loosening or tightening the screw changes the spring rate and therefore the resonant frequency of the cab on its mounts. The system allows the cab resonant frequency to be adjusted so that it differs from the frequency of the vibration induced into the tractor chassis by the tire lugs at the field-working speed. The isolation effectiveness of the mount system at higher frequencies remains relatively unchanged.

These and other objects, features and advantages of the present invention will become apparent from the following description and appended drawings.

DESCRIPTION OF THE PREFERRED EMBODIMENT

Figure 1:
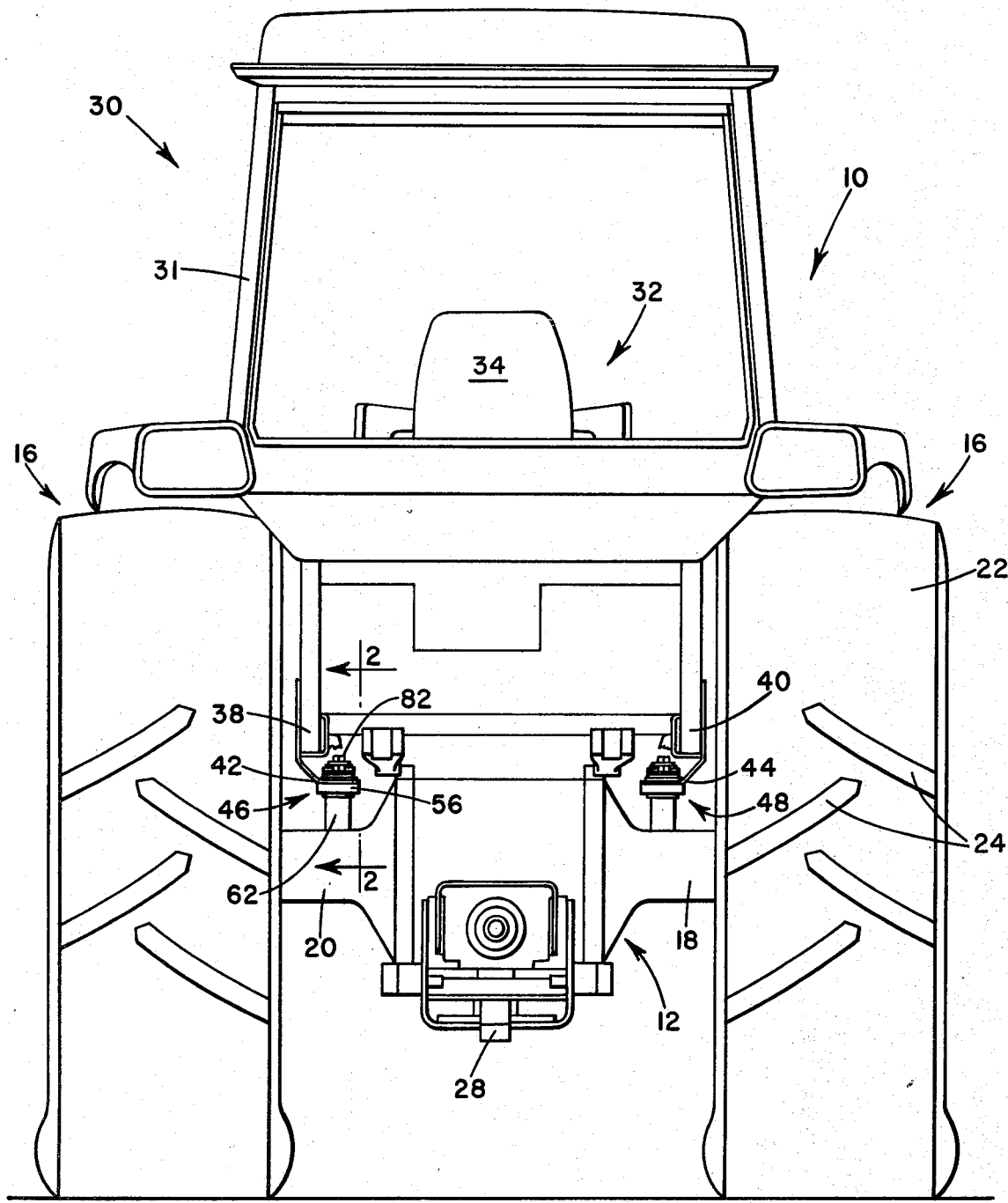
FIG. 1 is a perspective rear view of a tractor in which the present invention is embodied.

Referring to FIG. 1 there is shown an agricultural tractor indicated at 10 having a chassis or main frame 12. The chassis is supported at its rearward end by a pair of wheels 16 which are mounted on axles extending outwardly beyond axle housings 18 and 20. The wheels include conventional tires 22 with lugs 24. Located at the rear of the chassis 12 is a drawbar 28 for connecting to implements.

An operator's station 30 includes a cab 31 provided with a control console 32 located forwardly of a seat 34. The console 32 is connected by brackets (not shown) to the chassis 12 and is provided with vibration isolation by a pair of conventional forward resilient mount assemblies such as described in detail in the aforementioned reissue Pat. No. 29,123.

Located near the rear of the cab 31 are downwardly extending cab frame members 38 and 40. Rigidly connected to the members 38 and 40 are lower fore-and-aft extending apertured angle brackets 42 and 44, respectively, disposed in a generally horizontal plane. A pair of resilient mount assemblies 46 and 48 connect the cab frame members 38 and 40 with the left and right axle housings 20 and 18, respectively, to support the rear of the cab 31 above the chassis 12.

Figure 2:
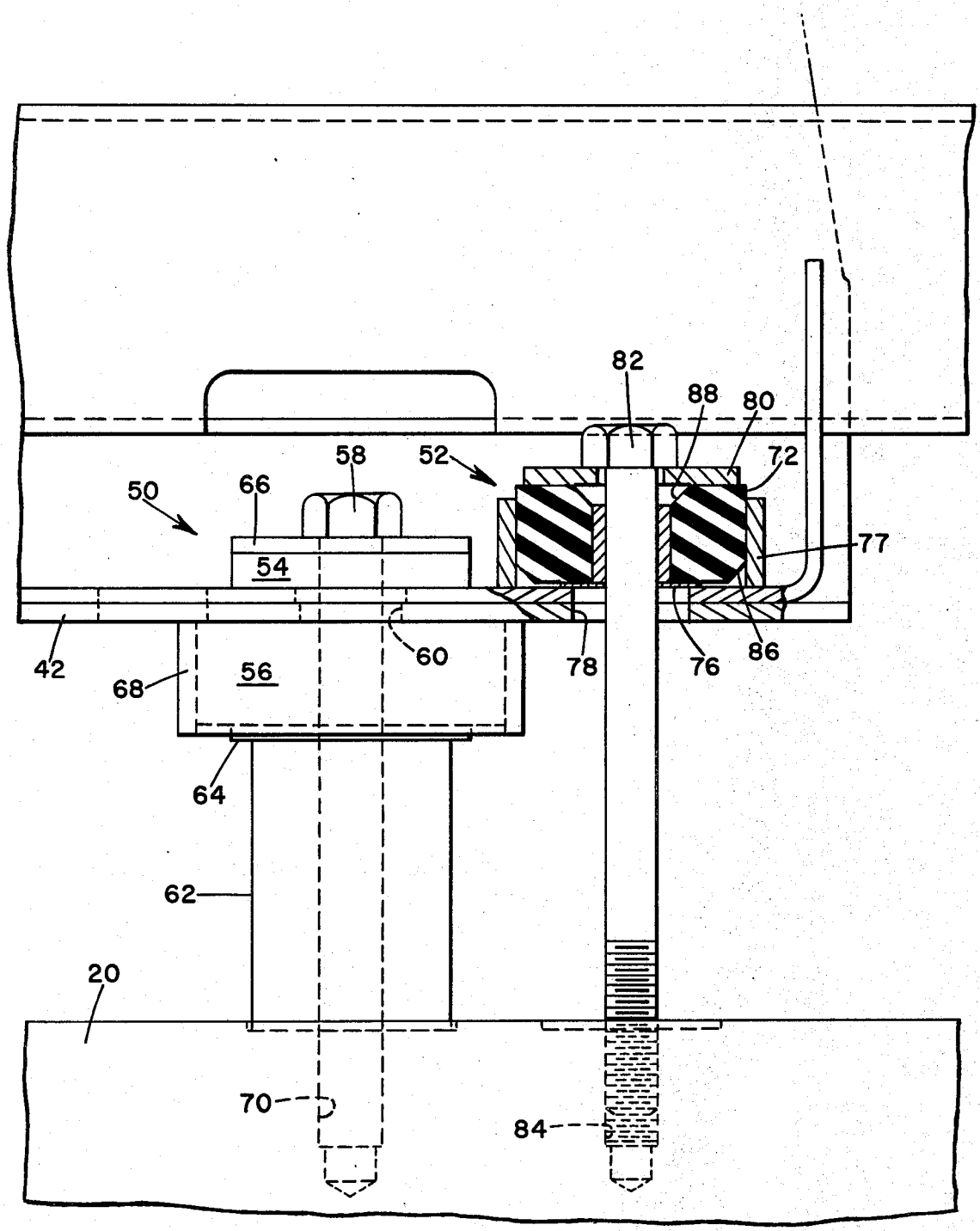
FIG. 2 is a side view partially in section of a portion of a rear mount assembly and an adjusting mount assembly associated therewith.

The mount assemblies 46 and 48 (FIG. 2) each include a conventional resilient mount assembly 50. An additional adjusting mount assembly 52 is located adjacent the conventional mount assembly 50.

The assembly 50 includes upper and lower resilient annular mounts 54 and 56, each having a central aperture for receiving a mounting bolt 58. Tubular inserts can be provided in the mount apertures to receive the bolt. The mounts 54 and 56 are positioned against opposite sides of the angle bracket 42 and have their central apertures aligned with an aperture 60 in the bracket. The lower mount 56 is spaced above the axle 20 by a hollow spacer 62 and a washer 64. A washer 66 is located over the mount 54. A cylindrical sleeve 68 surrounds the mount 56.

The bolt 58 holds the mounts 54 and 60 in place on opposite sides of the bracket 42. The threaded end of the bolt 58 is threaded into a tapped hole 70 provided in the upper portion of the axle housing 20 and torqued sufficiently to compress the mounts 54 and 56 between the washers 64 and 66. The mounts, which are preferrably formed from 40 durometer natural rubber, provide vibration isolation between the cab 31 and the tractor chassis 12. The spacer 62 is of sufficient length to support the rear of the cab 31 at the proper distance above the chassis 12.

The adjusting mount assemblies 52 associated with each of the conventional rear mount assemblies 46 and 48 include an annular mount 72 with a tubular metal insert or spacer 74 positioned within the mount aperture. A thin metal washer 76 is placed between the bracket 42 and the mount 72 to prevent the spacer 74 from slipping out of the mount. A sleeve 77 surrounds the mount 72. The aperture is aligned with an aperture 78 in the bracket 42 proximate the mount assembly 50. A washer 80 is placed over the mount 72 and an adjusting capscrew 82 is inserted through the insert and washers. The lower end of the capscrew 82 is threaded into a tapped hole 84 in the axle housing. Initially, the capscrew 82 is torqued until the mount 72 begins to be compressed between the bracket 42 and the washer 80 to bias the bracket 42 downwardly against the mount 56 of the assembly 50. As is evident from FIG. 2, the assembly 52 can be adjusted to increase or decrease the bias by rotating the capscrew into or out of the tapped hole 84. Accordingly, the spring rate of the mounting assembly is increased or decreased as the mounts are compressed or relaxed by adjusting the position of the capscrew 82.

In the preferred embodiment, the mount 72 is also fashioned from 40 durometer natural rubber. The outer lower circumference 86 and the opposite inner circumference 88 of the mount are beveled to approximately a 45 degree angle with respect to the horizontal.

Experience has shown that the natural or resonant frequency $f_n$ of a typical tractor cab on resilient mount assemblies is within a 0-40 hz range with the most severe vibration problems occurring in the 5-15 hz range. The actual resonant frequency will vary from tractor to tractor and depends on such factors as the type of mount assemblies used and the mass of the cab. For a typical lug tire such as shown at 22 in FIG. 1, the frequency of the vibration induced in the chassis 12 by the lugs 24 contacting the ground is approximately equal to twice the speed in miles per hour of the tractor. Therefore, severe vibration problems tend to be concentrated between tractor speeds of $2\frac{1}{2}$-$7\frac{1}{2}$ miles per hour which corresponds to a normal range of field working speeds.

The cab on its mounts is a spring and mass system having a resonant frequency dependent upon both the mass of the cab and the spring rate of the mount assemblies. By adjusting the capscrews 82 the spring rate can be changed to vary the resonant frequency of the cab. If, for example, the cab on its mount assemblies has a particular resonant frequency of $f_n=8$ hz, the tractor operator may experience annoying tire lug induced vibrations of the cab at a ground speed of about 4 miles per hour. When he wishes to operate at this speed, he can reduce the amplitude of the annoying vibrations by tightening the capscrews 82 to squeeze the mounts 56 and 72, thus increasing the spring rate and raising the natural frequency of the cab above the frequency of the vibrations induced in the chassis by the lugs. Alternatively, if the capscrews 82 are torqued tightly against the mount 72, they can be loosened to relax the mounts 56 and 72, thus decreasing the spring rate and lowering the natural frequency below the frequency of the induced vibrations. The adjusting mount assembly 52, therefore, allows the resonant frequency of the cab to be adjusted away from the frequency of the high amplitude vibrations in the chassis, such as those caused by the tire lugs hitting to ground, to prevent annoying noise and motion in the cab. The operator can actually tune the cab to match the particular working conditions and his personal preferences. By way of example, some typical cab resonance problems have been alleviated by adjusting the capscrews 82 until the spring rate increases to approximately $2\frac{1}{4}$ times the spring rate provided by the conventional mount assemblies alone. The change in the isolation effectiveness of the mount system above the resonant frequency was virtually unnoticeable to the operator.

In the preferred embodiment, adjusting mount assemblies 52 are provided adjacent the two rear resilient mount assemblies 50 only. However, adjusting assemblies could also be located near the front mount assemblies as well as at other locations between the cab and tractor chassis.

Having described the preferred embodiment, it will be apparent that modifications can be made without departing from the scope of the invention as defined in the accompanying claims.

I claim:

1. In a tractor having a chassis which vibrates at certain frequencies depending on the operating conditions of the tractor and a cab resiliently mounted on the chassis and vibrationally isolated therefrom by resilient mount assemblies, the cab on its mount assemblies having at least one natural frequency of vibration so that vibrations in the chassis at the natural frequency cause the cab to resonate, the improvement comprising adjustable means separate from the resilient mount assemblies connected between the chassis and the cab for selectively varying the natural frequency of the cab on its mount assemblies to avoid cab resonance for a preselected operating condition of the tractor.

2. The invention as set forth in claim 1 wherein the preselected operating condition is a working condition in the range of tractor speeds from about $2\frac{1}{2}$ to $7\frac{1}{2}$ miles per hour.

3. The invention as set forth in claims 1 or 2 wherein the adjustable means comprises a capscrew extending between the chassis and the cab, and a resilient mount compressed between the capscrew and the cab.

4. The invention as set forth in claim 3 wherein the capscrew and resilient mount are located adjacent a resilient mount assembly.

5. In a tractor with a cab, a frame, and a mounting structure including resilient mount assemblies connecting the cab to the frame, the tractor frame having vibrations induced therein the frequency of which are dependent on the operating condition of the tractor and the cab having a resonant frequency dependent on the spring rate of the resilient mount assemblies, the improvement comprising means for adjusting the resonant frequency of the cab away from a frequency of a predominant vibration created by the tractor at a preselected operating condition, said means including a resilient portion in addition to said resilient mount assemblies adjustably stressed between the cab and the frame and operative when adjusted to vary the spring rate of the resilient mount assemblies.

6. The invention as set forth in claim 5 wherein the resilient portion adjustably urges the cab downwardly against the resilient mount assemblies.

7. The invention as set forth in claim 5 or 6 wherein the frequency of the predominate vibration is within the range of about 5 to 15 hertz.

8. In a tractor having a main frame, a cab and a resilient mount assembly supporting the cab above and substantially vibrationally isolating it from the frame, the cab having a natural frequency of vibration dependent on the mount assembly spring rate and wherein the amplitude of vibration of the cab reaches a maximum in the resonant condition prevailing when the main frame is vibrating at the natural frequency, the tractor also including lugged ground wheels supporting the main frame for movement over the ground at various operating speeds, the wheels causing vibrations in the frame at a frequency depending on the operating speed, the improvement comprising means for adjusting the spring rate of the spring support means to change the natural frequency of the cab and avoid the resonant condition at the wheel-caused vibration frequency for a preselected operating speed, said means comprising a resilient member, separate from the resilient mount assembly, adjustably stressed between the cab and the frame.

9. The invention as set forth in claim 8 wherein the preselected operating speed lies within a range of speeds from about 2½ to 7½ miles per hour.

10. The invention as set forth in claim 8 wherein the means for adjusting the spring rate further includes means for adjustably urging said resilient member against the cab to compress the resilient mount assembly.

11. The invention as set forth in claim 10 wherein the means for adjustably urging the resilient member against the cab comprises an extensible and retractable rod member having one end connected to the main frame and the opposite end urging the resilient member against the cab.

12. In a tractor having a chassis which vibrates at a frequency dependent on the operating conditions of the tractor, a cab including a horizontally disposed mounting bracket, and a vibration isolating support system having a predetermined spring rate supporting the cab above the chassis, the support system having a resilient mount assembly including opposed resilient mounts on vertically opposite sides of the horizontal mounting bracket resiliently supporting the cab above the chassis, the cab having a natural frequency of vibration so that vibrations in the chassis at the natural frequency cause the cab to resonate, the improvement comprising a spring rate adjusting assembly located adjacent the resilient mount assembly and including a variably positionable resilient cab engaging member for adjustably compressing one of the opposed resilient mounts to change the spring rate of the support system and vary the natural frequency of the cab.

13. The invention as set forth in claim 12 wherein the spring rate adjusting assembly includes a bolt extending upwardly from the chassis in the direction of the horizontal mounting bracket and vertically adjustable with respect to the bracket, the upwardly extending end of the bolt supporting the resilient cab engaging member and compressing it against the bracket.

14. The invention as set forth in claim 13 wherein the upwardly extending end of the bolt extends upwardly beyond the upper surface of the mounting bracket, and the resilient cab engaging member is compressed between the end of the bolt and the upper surface.

15. The invention as set forth in claim 12 wherein the spring rate is adjustable to vary the natural frequency from approximately 5 to 15 hertz.

16. The invention as set forth in claims 12 or 15 wherein the spring rate adjusting assembly is adjusted to approximately double the preselected spring rate.

17. In a tractor having a chassis which vibrates at a frequency dependent on the operating conditions of the tractor, a cab including a horizontally disposed mounting bracket, and a vibration isolating support system having a preselected spring rate supporting the cab above the chassis, the support system having a resilient mount assembly including opposed resilient mounts on vertically opposite sides of the horizontal mounting bracket resiliently supporting the cab above the chassis, the cab having a natural frequency of vibration so that vibrations in the chassis at the natural frequency cause the cab to resonate, the improvement comprising a spring rate adjusting assembly located adjacent the resilient mount assembly and including a variably positionable resilient cab engaging member for adjustably compressing one of the opposed resilient mounts to change the spring rate of the support system and vary the natural frequency of the cab, the spring rate adjusting assembly comprising an annular resilient mount located on the upper portion of the horizontal mounting bracket adjacent the opposed resilient mounts, a sleeve surrounding the annular mount, a washer located on top of the annular mount, a bolt extending downwardly through the washer, the annular mount and the horizontal mounting bracket toward the chassis and adjustable with respect thereto to adjustably compress the annular mount between the washer and the bracket thereby urging the bracket downwardly.

18. The invention as set forth in claim 17 wherein the annular mount is fabricated from 40 durometer rubber.

* * * * *

UNITED STATES PATENT AND TRADEMARK OFFICE
CERTIFICATE OF CORRECTION

PATENT NO. : 4,271,921
DATED : 9 June 1981
INVENTOR(S) : Jon K. Ochsner

It is certified that error appears in the above—identified patent and that said Letters Patent is hereby corrected as shown below:

Column 5, line 41, delete "predetermined" and insert -- preselected --.

Signed and Sealed this

Thirteenth Day of April 1982

[SEAL]

Attest:

GERALD J. MOSSINGHOFF

*Attesting Officer*  *Commissioner of Patents and Trademarks*